United States Patent

[11] 3,556,241

[72] Inventors Robert W. Mitchell;
Billy J. Dodds, Houston, Tex.
[21] Appl. No. 770,528
[22] Filed Oct. 25, 1968
[45] Patented Jan. 19, 1971
[73] Assignee Stewart & Stevenson Services, Inc.
Houston, Tex.
a corporation of Texas

[54] STEERING SYSTEM
8 Claims, 10 Drawing Figs.
[52] U.S. Cl. ................................................. 180/79.2,
60/52; 180/45; 280/91, 280/96
[51] Int. Cl. ................................................. B62d 5/10,
B62d 7/14
[50] Field of Search .......................................... 280/91;
180/45, 46, 79.2

[56] References Cited
UNITED STATES PATENTS
1,681,893 8/1928 Barshell ........................ 180/45
3,087,564 4/1963 Quayle ......................... 180/79.2
3,255,840 6/1966 Tangen ......................... 180/45
3,306,390 2/1967 Jamme ......................... 180/79.2X FOREIGN PATENTS
451,813 8/1936 Great Britain ................ 180/45

Primary Examiner—A. Harry Levy
Attorneys—James F. Weiler, Jefferson D. Giller, William A. Stout, Paul L. DeVerter, II, Dudley R. Dobie, Jr. and Henry W. Hope ABSTRACT: A steering system in which all of the wheels are operated in synchronism for selectively steering a vehicle either one of conventionally, obliquely or rotatably in a circle. A cylinder and piston assembly connected to each wheel for rotating the wheels with the assemblies of the front wheels being connected together and the assemblies for the rear wheels being connected together, first releasable holding means connected between the vehicle frame and the front wheel connected assemblies and a second releasable holding means connected between the frame and the rear wheel connected assemblies, and selective actuated control means for selectively actuating each of the assemblies for conventionally steering by holding two of the wheels parallel and steering the vehicle by rotating the other two wheels in unison, for oblique steering rotating all of the wheels simultaneously, and for rotating the vehicle by positioning all of the wheels in circular alignment for allowing the vehicle to rotate about its vertical axis.

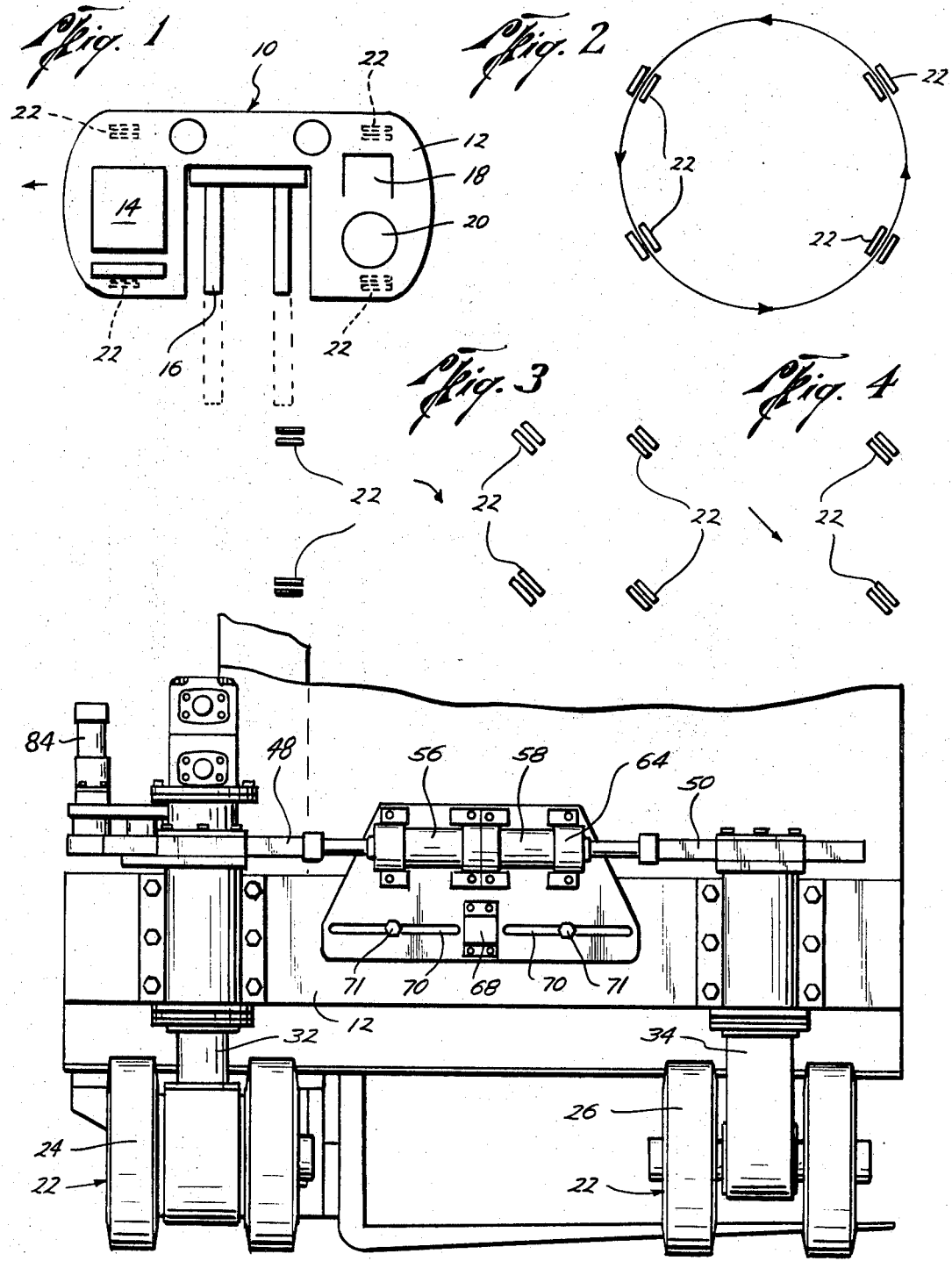

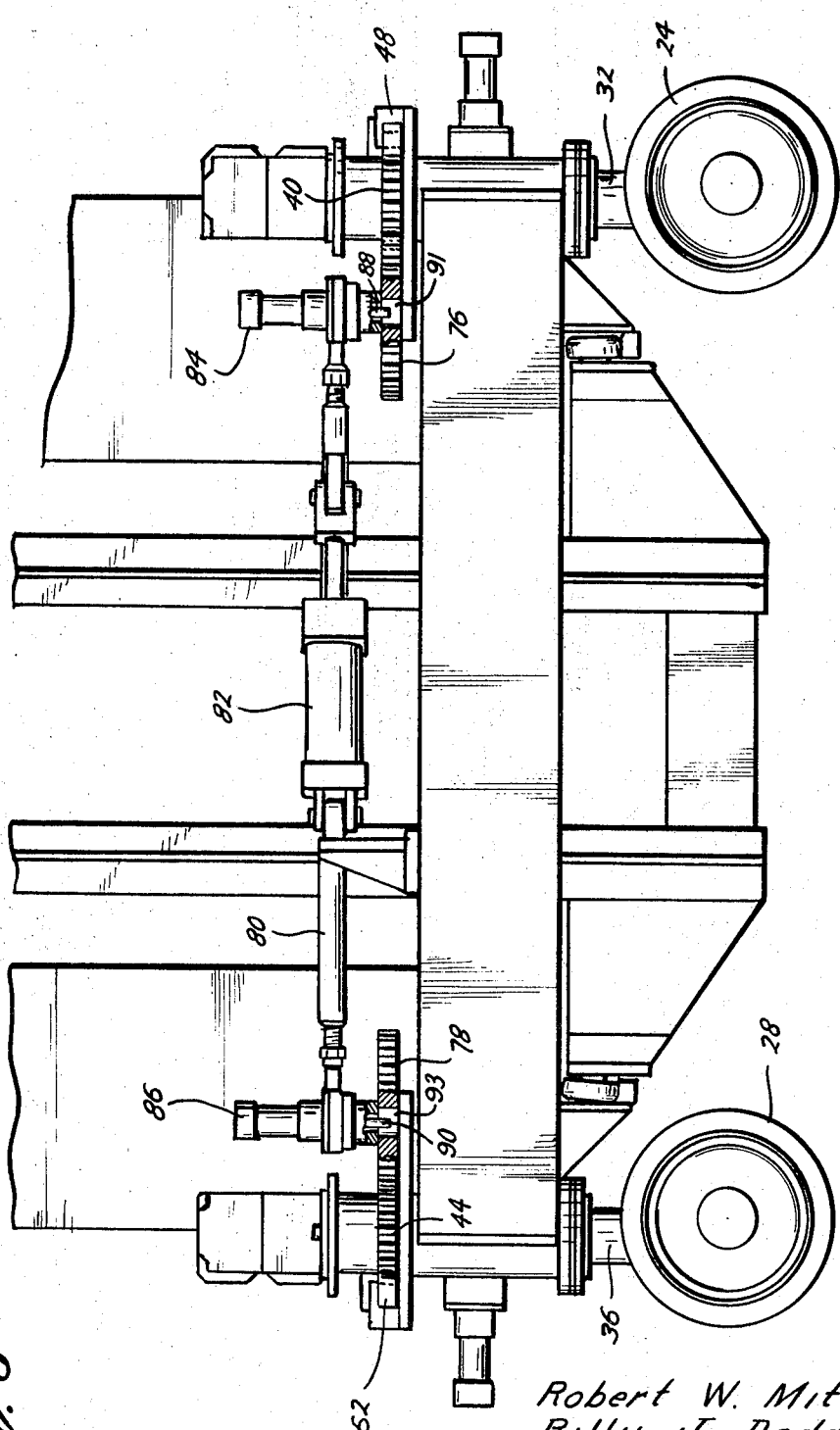

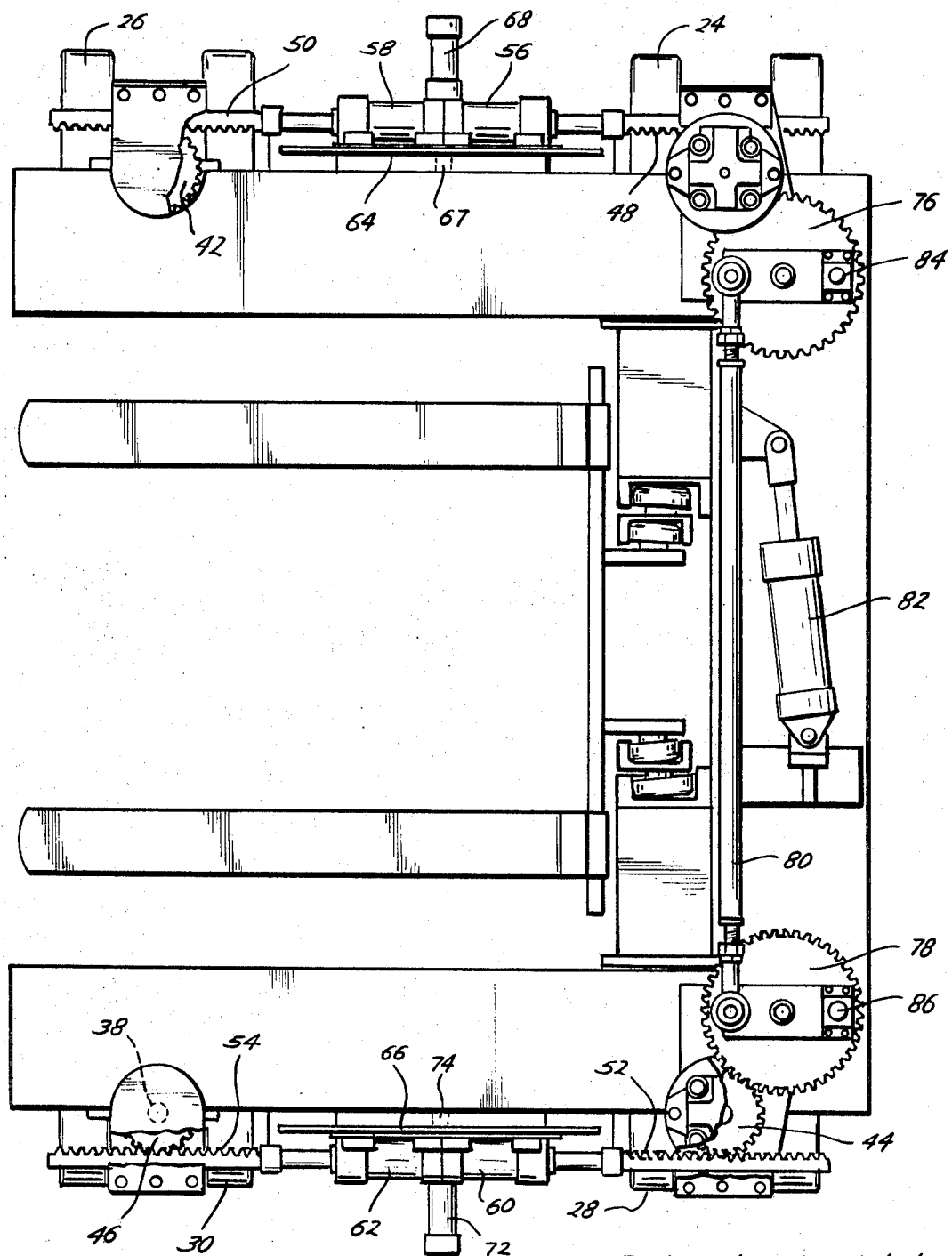

Robert W. Mitchell
Billy J. Dodds
INVENTORS

ATTORNEYS 3,556,241

STEERING SYSTEM

BACKGROUND OF THE INVENTION

Vehicles, such as forklift trucks, are widely used for handling materials and stacking and moving materials from one place to another or other operations which require high maneuverability. However, the material to be handled is frequently stored in warehouses or other locations having narrow aisles in which the truck must operate. Because of the limited maneuverability of conventional trucks, the material handling operations are time consuming, difficult, and expensive are require experienced drivers or large aisles resulting in the loss of expensive storage areas.

SUMMARY OF THE INVENTION

The present invention is directed to providing a hydraulic steering system for vehicles, such as for example only a forklift truck, by providing a highly maneuverable truck which can be steered either conventionally, obliquely, or rotated in a circle about its vertical axis.

A general object of the present invention is to provide a steering system for selective steering by providing conventional steering in which two of the wheels are held parallel and the vehicle conventionally steered by rotating the other two wheels in unison, and providing for oblique steering by rotating all of the wheels simultaneously, and providing rotative steering of the vehicle by rotating all of the wheels so that they are circularly aligned thereby allowing the truck to rotate about its vertical axis.

The present invention is further directed to providing a hydraulic steering system for a vehicle having a frame, two back wheels and two front wheels in which each of the wheels has a vertical axis rotatably connected to the frame with a steering gear connected to each axis and a rack meshing with each steering gear with a piston and cylinder assembly connected to each rack, the assemblies connected to the back wheels being connected together and the assemblies connected to the front wheels being connected together, a releasable holding piston and cylinder assembly connected between each of the back and front connected assemblies and to the frame and including a pin and coacting receiving opening one of which is on the frame and one of which is on the releasable holding assembly, with a first control gear connected to one of the steering gears upon the back wheels and a second control gear connected to one of the steering gears on the front wheels, a drive rod with releasable connecting piston and cylinder assemblies connected between each end of the drive rod and one of the control gears, and including a pin and coacting receiving opening and hydraulically actuated valve means for selectively actuating each piston and cylinder assembly for selectively steering the vehicle either one of conventional steering, oblique steering, and rotative steering.

BRIEF DESCRIPTION OF THE DRAWINGS

FIG. 1 is a schematic elevational view of a side load type forklift truck embodying the present invention;

FIG. 2 is a schematic elevational view showing the wheels of the truck of FIG. 1 positioned in a circle whereby the truck will rotate about its vertical axis;

FIG. 3 is a schematic elevational view of the positioning of the wheels of the truck of FIG. 1 for conventional steering;

FIG. 4 is a schematic elevational view of the positioning of the wheels of the truck of FIG. 1 in position for oblique steering;

FIG. 5 is an enlarged front elevational view, partly in section, illustrating a hydraulic steering system for the present invention;

FIG. 6 is an enlarged side elevational view, partly in section, illustrating the hydraulic steering system of the present invention;

FIG. 7 is an enlarged elevational view, in section, illustrating the hydraulic steering system of the present invention;

DESCRIPTION OF THE PREFERRED EMBODIMENT

Figure 8:
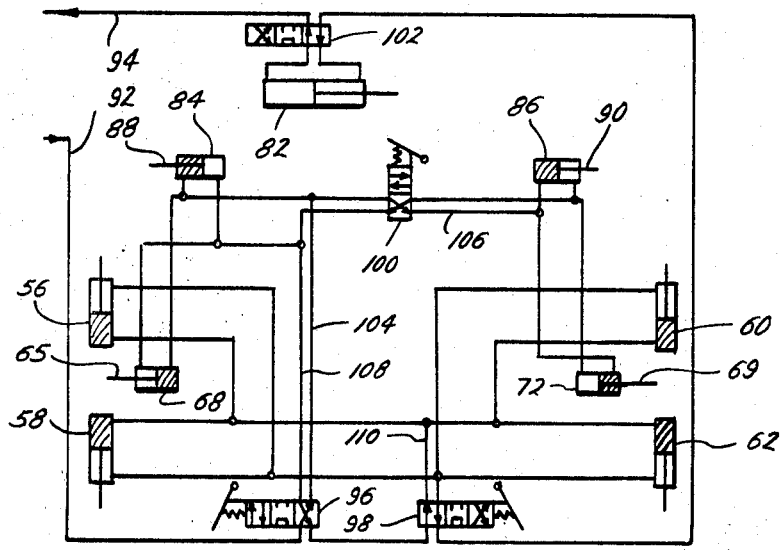
FIG. 8 is a schematic drawing of the hydraulic control system of the present invention in position for conventional steering.

While the present invention is suitable for various vehicles, the present invention will be described by way of example only in use with a forklift truck.

Referring now to the drawings, and particularly to FIG. 1, the reference numeral 10 generally indicates a conventional forklift truck of the side loader type having a frame 12, a prime mover 14 such as a diesel engine, the handling fork 16, a seat 18 for the driver and a steering wheel 20, and a plurality of wheels 22. In conventional vehicles, the back wheels are fixed and the front wheels steered as best seen in FIG. 3.

The present invention is directed to increasing the maneuverability of the truck 10 by providing a control system which in addition to providing the conventional steering shown in FIG. 3 provides for circularly aligning the wheels as shown in FIG. 2 whereby the truck 10 may be rotated about its vertical axis or in which all of the wheels, as best seen in FIG. 4, may be simultaneously rotated for an oblique or crabbing steering action.

While the steering control system of the present invention may be variously controlled such as by electrical or pneumatic controls, the preferred embodiment of hydraulic controls will be described. Referring now to FIGS. 5, 6 and 7, the plurality of wheels 22 may for convenience, be double wheels and where for convenience of reference wheels 24 and 26 may be the back wheels and wheels 28 and 30 may be front wheels. Each of the wheels may be supported from a vertical axis connected to the frame 12 and thus wheels 24 are connected to axis 32, wheels 26 connected to axis 34, wheels 28 connected to axis 36, and wheels 30 connected to axis 38. Suitable means are connected to each of the axis for rotating the connecting wheels and thus a steering gear 40, 42, 44 and 46 are provided connected to vertical axis 32, 34, 36 and 38 respectively. A rack is provided meshing with each of the steering gears for actuating the steering gears, and thus racks 48, 50, 52 and 54 are provided meshing with gears 40, 42, 44 and 46, respectively. Each of the racks is in turn connected to and actuated by a wheel rotation assembly and thus aligning piston and cylinder assemblies 56, 58, 60 and 62 are provided connected to racks 48, 50, 52 and 54, respectively, preferably with the piston rods of the assemblies being connected to the racks.

The piston and cylinder assemblies 56 and 58 connected to the back wheels 24 and 26 are connected together and mounted on a support 64 whereby selective steering motion may be transmitted through the connected assemblies as will be more fully described hereinafter. Similarly, piston and cylinder assemblies 60 and 62 operating the front wheels are connected together and supported from a support 66.

A releasable holding piston and cylinder assembly 68 is connected on support 64 and releasably secures the support 64 to the frame 12 by actuation of a pin 65 connected to the piston which engages a hole 67 in the frame 12 thereby preventing the support 64 from moving relative to the frame 12. Otherwise, when the pin 65 is disengaged, the support 64 is slidable across the frame 12 by virtue of the slots 70 and pins 71 connection of the support 64 to the frame 12.

A similar structure is provided for the front wheels in which a releasable holding piston and cylinder assembly 72 is provided for actuating a pin 69 (FIGS. 8, 9 and 10) for engagement with an opening 74 in the frame 12 for securing the support 66 to the frame 12, and when disengaged allows the support 66 to move laterally relative to the frame 12.

A first control gear 76 is provided connected to one of the steering gears connected to one of the back wheels such as steering gear 40, for transmitting steering to the back wheels 24 and 26 and a second control gear 78 is connected to one of the front steering gears 44 for providing steering to the front wheels 28 and 30.

Drive rod 80 which is connected to and controlled by a steering piston and cylinder assembly 82. Each end of the rod 80 is actuated to control gears 76 and 78 through a releasable connecting piston and cylinder assembly 84 and 86 respectively which in turn actuate a pin 88 and 90, respectively, for engaging an opening 91 and 93, respectively, in the gears 76 and 78. respectively, whereby the driving motion of drive rod 80 may be selectively connected to control gears 76 and 78.

By hydraulically actuating the piston and cylinder assemblies 56, 58, 60, 62, 68, 72, 84 and 88 selectively, the truck 10 can be steered conventionally, obliquely at any angle, or rotative around the vertical axis of the truck.

In operation, and referring first to FIG. 8, the hydraulic schematic for operation of the steering assembly for conventional steering is best seen. Thus, hydraulic fluid inlet line 92 and hydraulic outlet line 94 are provided to supply hydraulic fluid to and from the various piston and cylinder assemblies. Hydraulic control valves 96 and 98 are provided which are three position valves which may be of a conventional type manufactured by Dukes, Model DV-033, as shown on page 51G in the Fluid Power Designer's Manual and Catalog 365F published 1967 by Womack Machine Supply Co. of Dallas, Texas. A two position control valve 100 is provided which may be of a conventional type such as Dennison, Model DD12-12—07-05, as shown on pages 18 and 19 in Bulletin 505 of the Abex Corporation, Dennison division, dated 5/67, and a steering control valve 102 is provided which may be of a conventional type such as Char-Lynn, Model UMOI-A as shown on pages 96 and 96A of the Fluid Power Designer's Manual noted above. For conventional steering, the fluid from inlet line 92 flows through control valve 96, in the position indicated, to line 104 to the releasable connecting piston and cylinder assembly 84 retracting pin 88 from control gear 76 thereby disconnecting drive rod 80 from gear 76 and the back wheels 24 and 26. Fluid from line 104 also is connected to releasable holding piston and cylinder assembly 68 (FIGS. 5 and 7) behind the piston to actuate pin 65 into engagement with opening 67 in the frame 12 to secure the support 64 relative to the frame 12. Fluid from line 104 passes through control valve 100, in the position indicated in FIG. 8, to line 106 to the releasable connecting piston and cylinder assembly 86 for actuating pin 90 to engage in opening the second control gear 78 whereby any steering motion of the drive rod 80 will be transmitted to gear 78. Fluid from line 106 will also be transmitted to releasable holding piston and cylinder assembly 72 to retract pin 69 from opening 74 in the frame 12 (FIG. 7) to disconnect the support 66 from the frame 12 and allow lateral movement thereto. Return fluid from piston and cylinder assemblies 84, 68, 86 and 72 flows through line 108, through control valve 96, and through control valve 98, which is in the position indicated, to line 110. Fluid from line 110 is transmitted to piston and cylinder assemblies 56 and 58 at the back wheels 24 and 26. Since piston assemblies 56 and 58 are connected together and now secured to the frame 12 by assembly 68, actuation of the assemblies 56 and 58 will control the position of back wheels 24 and 26 and will be unaffected by the drive rod 80 since the drive rod is disconnected from control gear 76. Thus, actuation of assemblies 56 and 58 acts to move racks 48 and 50 and in turn to rotate steering gears 40 and 42 to position the back wheels 24 and 26 in a parallel position to each other and to the horizontal axis of the truck 10. In addition, fluid from line 110 flows to piston and cylinder assemblies 60 and 62 to the front wheels, and since assemblies 60 and 62 are connected together on the support 66 the racks 52 and 54 respectively are actuated to position the front wheels 28 and 30 parallel to each other by the rotation of the steering gears 44 and 46. Thereafter, control valve 102 is actuated to control the steering piston and cylinder assembly 82 which controls the drive rod 80 which in turn will rotate control gear 78 which in turn derives the front wheels 28 and 30 through steering gear 46, rack 52, the connected assemblies 60 and 62 which, since disconnected from the frame 12, may be laterally moved, the rack 54, and gear 46.

Figure 9:
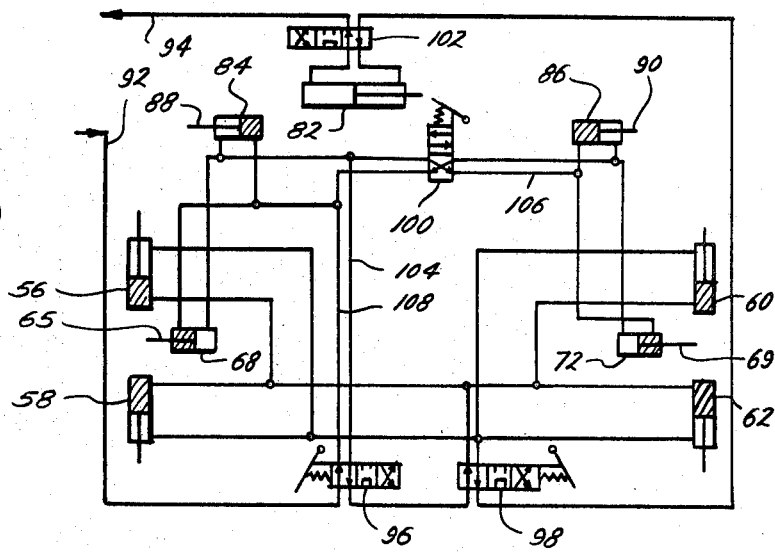
FIG. 9 is a hydraulic schematic drawing of the present invention in position for oblique steering.

Referring now to FIG. 9, the actuation of the hydraulic steering system for oblique steering is best seen. For this operation, all of the wheels are disconnected from the frame and are controlled simultaneously for rotation in any desired direction. This fluid front line 92 is transmitted through control valve 96, which is now in the position shown, to line 108 to assembly 84 which actuates pin 88 into coaction with the first control gear 76 thereby connecting gear 76 to drive rod 80. Fluid from line 108 also is transmitted to assembly 68 to retract pin 65 from opening 67 in the frame 12 for allowing the assemblies 56 and 58 to move lateral across the frame. Fluid from line 108 is also transmitted through control valve 100, which is in the position shown, to transmit fluid to line 106. Fluid from line 106 is transmitted to assembly 86 for actuating the pin 90 into engagement with gear 78 whereby movement of the drive rod 80 will be transmitted to gear 78. Fluid from line 106 is also transmitted to assembly 72 to disconnect pin 69 from opening 74 in the frame 12 to release the connected assemblies 60 and 62 from engagement with the frame. Return fluid from assemblies 84, 68, 86 and 72 are transmitted through line 104, control valve 96, and through control valve 98, in the position indicated, to line 110. Fluid from line 110 is transmitted to assemblies 56 and 58 to rotate the back wheels 24 and 26 to a position parallel to each other, and fluid is also transmitted to assemblies 60 and 62 to rotate the front wheels 28 and 30 to a position parallel to each other. Thereafter, control valve 102 is actuated by steering wheel 20 to control steering piston and cylinder assembly 82 to move the drive rod 80 and control simultaneously the rotation of all of the wheels through control gears 76 and 78 whereby the back wheels 24 and 26 are controlled through steering gear 40, rack 48, the connected assemblies 56 and 58 which are free to move laterally relative to frame 12, rack 50 and steering gear 42, and whereby the front wheels 28 and 30 are simultaneously controlled by rotation of steering gear 44, rack 52, the connected assemblies 60 and 62 which are free to move laterally relative to the frame 12, rack 54, and steering gear 46.

Figure 10:
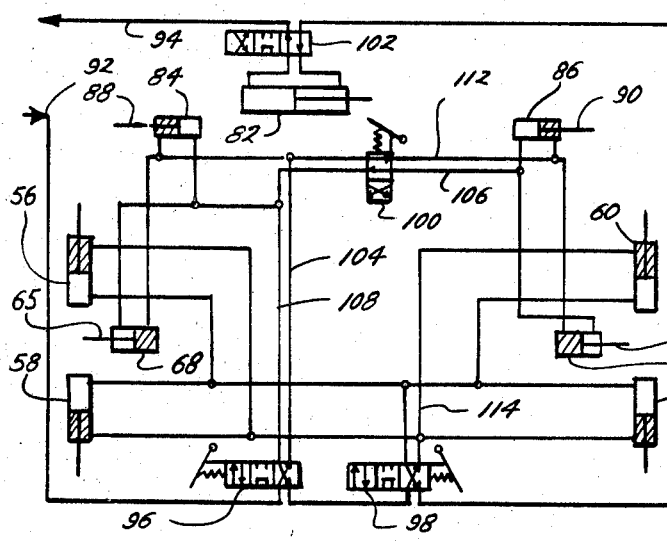
FIG. 10 is a hydraulic schematic drawing of the present invention in position for rotation.

Referring now to FIG. 10, the hydraulic schematic for circularly aligning all of the wheels 24, 26, 28 and 30 for rotation of the truck 10 about its vertical axis is best seen. This operation is accomplished by disconnecting the wheels from the control of the drive rod 80, securing the connected front and rear assemblies 56, 58, 60 and 62 to the frame 12 and rotating the wheels all inwardly into a circular alignment. Thus, hydraulic fluid again is received from line 92 passes through control valve 96, which is now in the position shown, to transmit fluid to line 104. Fluid from line 104 is transmitted to assembly 84 to retract pin 88 from engagement with control gear 76 disconnecting the back wheels from control of the drive rod 80. Fluid from line 104 also flows to assembly 68 actuating the pin 65 into engagement with the opening 67 in the frame 12 to secure connected assemblies 56 and 58 and their support 64 to the frame 12. Fluid from line 104 passes through control valve 100, now in the position shown, to line 112 to assembly 86 to retract pin 90 from its engagement with the control gear 78 disconnecting the control of front wheels from the drive rod 80. Fluid from line 112 also is transmitted to assembly 72 to actuate rod 69 into engagement with opening 74 in the frame 12 to secure the connected assemblies 60 and 62 and their support 66 to the frame 12. Fluid leaving assemblies 84, 68, 86 and 72 returns through line 108 through control valve 96 and flows through control valve 98, which is now in the position shown, to line 114. Fluid from line 114 is transmitted to wheel assemblies 56, 58, 60 and 62 which retracts racks 48, 50, 52 and 54 and in turn rotates steering gears 56, 58, 60 and 62 to rotate the wheels 24, 26, 28 and 30 inwardly in circular alignment, as shown in FIG. 2, whereby the truck 10 will then pivot around its vertical axis and rotate.

The present invention therefore is well suited and adapted to attain the objects and attain the ends and advantages mentioned as well as those inherent therein.

We claim:

1. A steering system for a four wheel truck having a frame, two front wheels and two back wheels for either conventional steering, oblique steering or rotational steering of said truck comprising:

said front two wheels and said rear two wheels each having a cylinder and piston assembly connected to each wheel for rotating said wheels with the assemblies for the front wheels being connected together and the assemblies for the rear wheels being connected together;

first releasable holding means connected between the frame and the front wheel connected assemblies for connecting and releasing said front assemblies from the frame;

second releasable holding means connected between the frame and the rear wheels connected assemblies for connecting and releasing said rear assemblies from the frame;

hydraulic actuated means for selectively actuating each of said cylinder and piston assemblies and said first and second releasable holding means and for rotating said wheels whereby said truck may be conventionally steered, steered obliquely, or circularly rotated about its vertical axis; and said hydraulic actuated means includes:
a steering rod;
means for moving said steering rod;
gear means for laterally moving each of said connected assemblies; and
piston and cylinder actuated drive releasable connecting means connected between the steering rod and said gear means.

2. A steering system for a four wheel truck having a frame, two back wheels and two front wheels for either conventional steering, oblique steering or rotative steering of the truck comprising:

each of said wheels having a vertical axis rotatably connected to said frame;

a wheel rotation assembly connected to each vertical axis for rotating the connected wheel, the assemblies connected to the back wheels being connected together, and the assemblies connected to the front wheels being connected together;

releasable holding means connected between each of the connected assemblies and said frame;

a drive rod;

releasable connecting means between the drive rod and each of the connected assemblies for connecting selectively the movement of the drive rod to the connected assemblies for rotating the wheels; and control means for selectively actuating the wheel rotation assemblies, the releasable holding means, and the releasable connecting means for selectively steering the truck conventionally, obliquely, or rotatively.

3. The apparatus of claim 2 wherein the releasable holding means including:

a releasable holding piston and cylinder assembly; and
a pin and coacting receiving opening, one of which is on the frame and the other on the releasable holding assembly.

4. The apparatus of claim 3 wherein:
a steering gear is connected to each vertical axis; and
a rack meshing with each steering gear and connected to one of the steering piston and cylinder assemblies.

5. The apparatus of claim 3 including:
a control gear positioned adjacent each end of the drive rod and connected to one of the connected assemblies;
wherein the releasable connecting means includes:
a releasable connecting piston and cylinder assembly; and
a pin and coacting receiving opening, one of which is on the control gear and the other of which is connected to the drive rod.

6. A steering system for a four wheel truck having a frame for either conventional steering, oblique steering or rotative steering of said truck comprising:

each of said wheels having a vertical axis rotatably connected to said frame;
a steering gear connected to each axis;
a rack meshing with each steering gear;
a piston and cylinder assembly connected to each rack, the assemblies connected to the back wheels being connected together, and the assemblies connected to the front wheels being connected together;
releasable holding means connected between each of the connected assemblies and said frame;
a first control gear connected to one of the steering gears connected to one of the back wheels;
a second control gear connected to one of the steering gears connected to one of the front wheels;
a drive rod;
releasable connecting means between the drive rod and each of the control gears; and
control means for selectively actuating said piston and cylinder assemblies, the releasable holding means and the releasable connecting means for selectively steering the truck conventionally, obliquely, or rotatively.

7. A hydraulic steering system for a truck having a frame, two back wheels and two front wheels for either conventional steering, oblique steering or rotative steering of the truck comprising:

each of said wheels having a vertical axis rotatably connected to the frame;
a steering gear connected to each axis;
a rack meshing with each steering gear;
a piston and cylinder assembly connected to each rack, the assemblies connected to the back wheels being connected together, and the assemblies connected to the front wheels being connected together;
a releasable holding piston and cylinder assembly connected between each of the connected assemblies and the frame and including a pin and coacting receiving opening, one of which is on the frame and one of which is on the releasable holding assembly;
a first control gear connected to one of the steering gears connected to one of the back wheels;
a second control gear connected to one of the steering gears connected to one of the front wheels;
a drive rod;
a releasable connecting piston and cylinder assembly connected between each end of the drive rod and one of the control gears and including a pin and coacting receiving opening; and
hydraulic actuated means for selectively actuating each piston and cylinder assembly for selectively steering the truck either one of conventional steering, oblique steering, and rotative steering.

8. The apparatus of claim 7 wherein the selectively actuating means includes:

for conventional steering;
valve means for actuating the releasable holding piston and cylinder assembly connected to the back wheels for causing its pin to engage its opening;
valve means for actuating the piston and cylinder assemblies connected to the back wheels for rotating said back wheels parallel to each other;
valve means for actuating the releasable connecting piston and cylinder assembly connected to the first control gear for disengaging its pin from its opening;
valve means for actuating the releasable holding piston and cylinder assembly connected to the front wheels for causing its pin to disengage its opening;
valve means for actuating the piston and cylinder assemblies connected to the front wheels for rotating said front wheels parallel to each other;

valve means for actuating the releasable connecting piston and cylinder assembly connected to the second control gear for engaging its pin in its opening whereby the front wheels may be steered conventionally by movement of the drive rod, for oblique steering;

valve means for actuating the releasable holding piston and cylinder assembly connected to the back wheels for causing its pin to disengage its opening;

valve means for actuating the piston and cylinder assemblies connected to the back wheels for rotating said back wheels initially parallel to each other;

valve means for actuating the releasable connecting piston and cylinder assembly connected to the first control gear for engaging its pin in its opening;

valve means for actuating the releasable holding piston and cylinder assembly connected to the front wheels for causing its pin to disengage its opening;

valve means for actuating the piston and cylinder assemblies connected to the front wheels for rotating said front wheels initially parallel to each other;

valve means for actuating the releasable connecting piston and cylinder assembly connected to the second control gear for engaging its pin in its opening whereby movement of the drive rod will rotate all wheels, for rotative steering;

valve means for actuating the releasable holding piston and cylinder assembly connected to the back wheels for causing its pin to engage its opening;

valve means for actuating the piston and cylinder assemblies connected to the back wheels for rotating the back sides of the back wheels inwardly;

valve means for actuating the releasable connecting piston and cylinder assembly connected to the first control gear for disengaging its pin from its opening;

valve means for actuating the releasable holding piston and cylinder assembly connected to the front wheels for causing its pin to disengage its opening;

valve means for actuating the piston and cylinder assemblies for rotating the front sides of the front wheels inwardly; and valve means for actuating the releasable connecting piston and cylinder assembly connected to the second control gear for engaging its pin in its opening.